[redacted]
BEST AVAILABLE COPY
No. 12,217
AI 172
J. L. Rollard,
Additional improvement
Bread Machine
Additional Improvement July 21. 1857
AI ~~No.~~ 172.
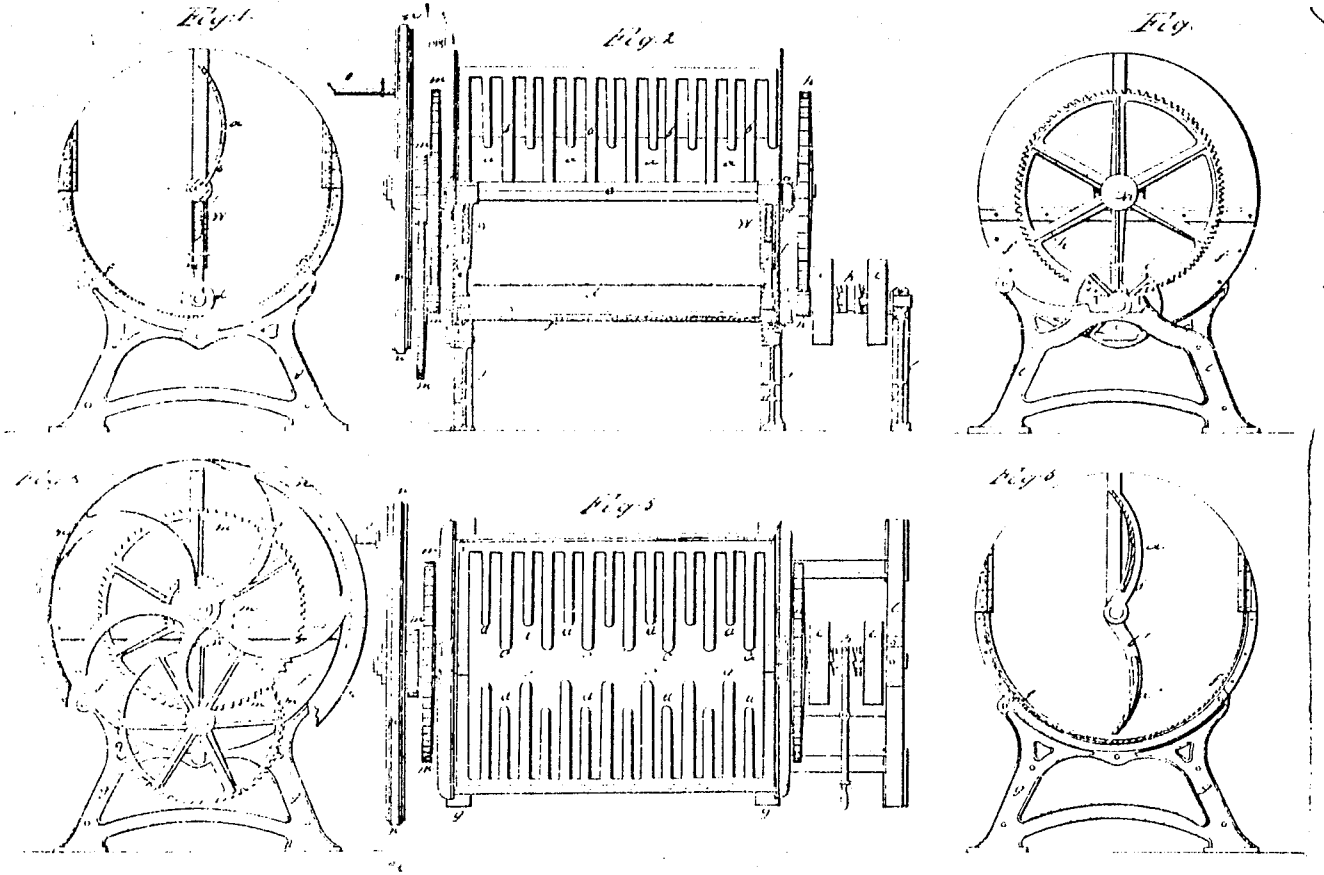
Original patent 12217